US008801296B2

United States Patent
LeBlanc et al.

(10) Patent No.: US 8,801,296 B2
(45) Date of Patent: Aug. 12, 2014

(54) FIBER OPTIC CABLE BUNDLE WITH STAGGERED CONNECTORS

(75) Inventors: Thomas G. LeBlanc, Westminster, MA (US); Ronald J. Kleckowski, Manchester Center, VT (US)

(73) Assignee: ADC Telecommunications, Inc., Berwyn, PA (US)

( * ) Notice: Subject to any disclaimer, the term of this patent is extended or adjusted under 35 U.S.C. 154(b) by 205 days.

(21) Appl. No.: 13/019,735

(22) Filed: Feb. 2, 2011

(65) Prior Publication Data

US 2011/0188809 A1 Aug. 4, 2011

Related U.S. Application Data

(60) Provisional application No. 61/300,689, filed on Feb. 2, 2010.

(51) Int. Cl.
*G02B 6/40* (2006.01)

(52) U.S. Cl.
USPC .......................................................... 385/54

(58) Field of Classification Search
None
See application file for complete search history.

(56) References Cited

U.S. PATENT DOCUMENTS

| 2,767,742 | A | 10/1956 | Channell |
|---|---|---|---|
| 3,991,014 | A | 11/1976 | Kleinschuster |
| 4,067,852 | A | 1/1978 | Calundann |
| 4,083,829 | A | 4/1978 | Calundann et al. |
| 4,130,545 | A | 12/1978 | Calundann |
| 4,161,470 | A | 7/1979 | Calundann |
| 4,318,842 | A | 3/1982 | East et al. |
| 4,395,869 | A | 8/1983 | Priaroggia et al. |
| 4,468,364 | A | 8/1984 | Ide |
| 4,715,582 | A | 12/1987 | Ikeda et al. |
| 4,744,935 | A | 5/1988 | Priaroggia et al. |
| 4,763,983 | A | 8/1988 | Keith |
| 4,832,442 | A | 5/1989 | Pappas |
| 5,126,167 | A | 6/1992 | Matsuno et al. |
| 5,136,673 | A | 8/1992 | Yoshizawa et al. |

(Continued)

FOREIGN PATENT DOCUMENTS

| JP | 59-195617 | 11/1984 |
|---|---|---|
| JP | 60-177312 | 9/1985 |

(Continued)

OTHER PUBLICATIONS

International Search Report and Written Opinion mailed Oct. 27, 2011.

(Continued)

*Primary Examiner* — Sung Pak
(74) *Attorney, Agent, or Firm* — Merchant & Gould P.C.

(57) ABSTRACT

A fiber optic cable bundle includes a first group of fiber optic cables and a second group of fiber optic cables. Each fiber optic cable in the first group includes a first axial end and an oppositely disposed second axial end. The first axial end of each fiber optic cable in the first group includes a connector. Each fiber optic cable in the second group includes a first axial end and an oppositely disposed second axial end. The first axial end of each fiber optic cable in the second group includes a connector. The connectors of the second group are offset from the connectors of the first group by a first axial offset distance. A plurality of binder members is contra-helically served about the first and second groups of fiber optic cables.

21 Claims, 11 Drawing Sheets

(56) References Cited

U.S. PATENT DOCUMENTS

| | | | |
|---|---|---|---|
| 5,209,416 A | | 5/1993 | LeCompte |
| 5,268,971 A | * | 12/1993 | Nilsson et al. ............... 385/101 |
| 5,279,474 A | | 1/1994 | LeCompte |
| 5,317,663 A | | 5/1994 | Beard et al. |
| 5,345,525 A | | 9/1994 | Holman et al. |
| 5,345,526 A | | 9/1994 | Blew |
| 5,390,273 A | | 2/1995 | Rahman et al. |
| 5,421,501 A | | 6/1995 | Haines |
| 5,448,670 A | | 9/1995 | Blew et al. |
| 5,497,444 A | | 3/1996 | Wheeler |
| 5,595,355 A | | 1/1997 | Haines |
| 5,717,810 A | | 2/1998 | Wheeler |
| 5,863,083 A | | 1/1999 | Giebel et al. |
| 5,905,834 A | | 5/1999 | Anderson et al. |
| 6,491,051 B2 | | 12/2002 | Pierce et al. |
| 6,557,249 B1 | | 5/2003 | Pruett et al. |
| 6,612,516 B1 | | 9/2003 | Haines |
| 6,775,445 B2 | | 8/2004 | Kobayashi et al. |
| 6,805,333 B2 | | 10/2004 | Delaney et al. |
| 7,016,592 B2 | | 3/2006 | Elkins, II et al. |
| 7,090,406 B2 | | 8/2006 | Melton et al. |
| 7,151,879 B2 | | 12/2006 | Ishikawa et al. |
| 7,379,642 B2 | | 5/2008 | Kachmar |
| 7,416,349 B2 | | 8/2008 | Kramer |
| 7,418,177 B2 | | 8/2008 | Lu et al. |
| 7,421,169 B2 | | 9/2008 | Honjo et al. |
| 7,587,111 B2 | | 9/2009 | de Montmorillon et al. |
| 7,623,747 B2 | | 11/2009 | de Montmorillon et al. |
| 7,644,905 B2 | | 1/2010 | Ogata et al. |
| 7,715,679 B2 | | 5/2010 | Kowalczyk et al. |
| 2005/0029004 A1 | | 2/2005 | Robinson et al. |
| 2005/0259930 A1 | * | 11/2005 | Elkins et al. ............... 385/100 |
| 2005/0265672 A1 | | 12/2005 | Theuerkorn et al. |
| 2008/0063351 A1 | * | 3/2008 | Elkins et al. ............... 385/138 |
| 2009/0294016 A1 | | 12/2009 | Sayres et al. |
| 2009/0317038 A1 | | 12/2009 | Kachmar |
| 2009/0317047 A1 | | 12/2009 | Smith et al. |
| 2010/0014819 A1 | | 1/2010 | Herbst |
| 2012/0128309 A1 | | 5/2012 | Kachmar et al. |

FOREIGN PATENT DOCUMENTS

| | | |
|---|---|---|
| JP | 8-201634 | 8/1996 |
| JP | 2000-232710 | 8/2000 |
| JP | 2002-95121 | 3/2002 |
| WO | WO 2004/079423 A1 | 9/2004 |

OTHER PUBLICATIONS

Cable-lashing machine from http:///www.cablinginstall.com/articles/print/volume-5/issue-9/products-services/new-pro . . . , 1 page (Sep. 1, 1997).

GMP Model G Cable Lasher Operation and Maintenance Manual, 16 pages (Copyright 2005).

International Search Report and Written Opinion for PCT/US2011/037153 mailed Feb. 9, 2012.

Communication and extended European search report dated Nov. 6, 2013; Application No. EP 11740299.

* cited by examiner

FIBER OPTIC CABLE BUNDLE WITH STAGGERED CONNECTORS

CROSS-REFERENCE TO RELATED APPLICATIONS

This application claims the benefit of U.S. Provisional Patent Application Ser. No. 61/300,689, entitled "Fiber Optic Cable Bundle with Staggered Connectors" and filed on Feb. 2, 2010, the disclosure of which is hereby incorporated by reference in its entirety.

BACKGROUND

As demand for telecommunications increases, optical fiber services are being extended in more and more areas. In order for a residence or business to access these optical fiber services, fiber optic cables must be installed in these residences and businesses. In some cases, the fiber optic cables are installed in existing structures. In other cases, these fiber optic cables are installed in new constructions.

In either case, however, fiber optic cables are usually routed through enclosed spaces, such as between support structures disposed inside walls. As these enclosed spaces can be rather small, there exists a need for a compact cable arrangement.

SUMMARY

An aspect of the present disclosure relates to a fiber optic cable bundle assembly. The fiber optic cable bundle assembly includes a fiber optic cable bundle having a first end portion and an oppositely disposed second end portion. The fiber optic cable bundle includes a first group of fiber optic cables and a second group of fiber optic cables. Each fiber optic cable in the first group includes a connector at a first axial end. Each fiber optic cable in the second group includes a connector at a first axial end of the fiber optic cable of the second group. The connectors of the second group are offset from the connectors of the first group by a first axial offset distance at the first end portion of the fiber optic cable bundle. A plurality of binder members is contra-helically served about the fiber optic cable bundle.

Another aspect of the present disclosure relates to a fiber optic cable assembly. The fiber optic cable assembly includes a cable spool and a fiber optic cable bundle assembly. The cable spool includes a drum portion. The fiber optic cable bundle assembly is disposed about the drum portion of the cable spool. The fiber optic cable bundle assembly includes a fiber optic cable bundle having a first end portion and a second end portion. The fiber optic cable bundle includes a first group of fiber optic cables and a second group of fiber optic cables. Each of the fiber optic cables of the first group has a first axial end disposed at the first end portion of the fiber optic cable bundle. Each of the fiber optic cables of the second group has a first axial end disposed at the first end portion of the fiber optic cable bundle. The first axial ends of the second group are axially offset from the first axial ends of the first group by a first axial offset distance. A plurality of binder member is contra-helically served about the fiber optic cable bundle.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
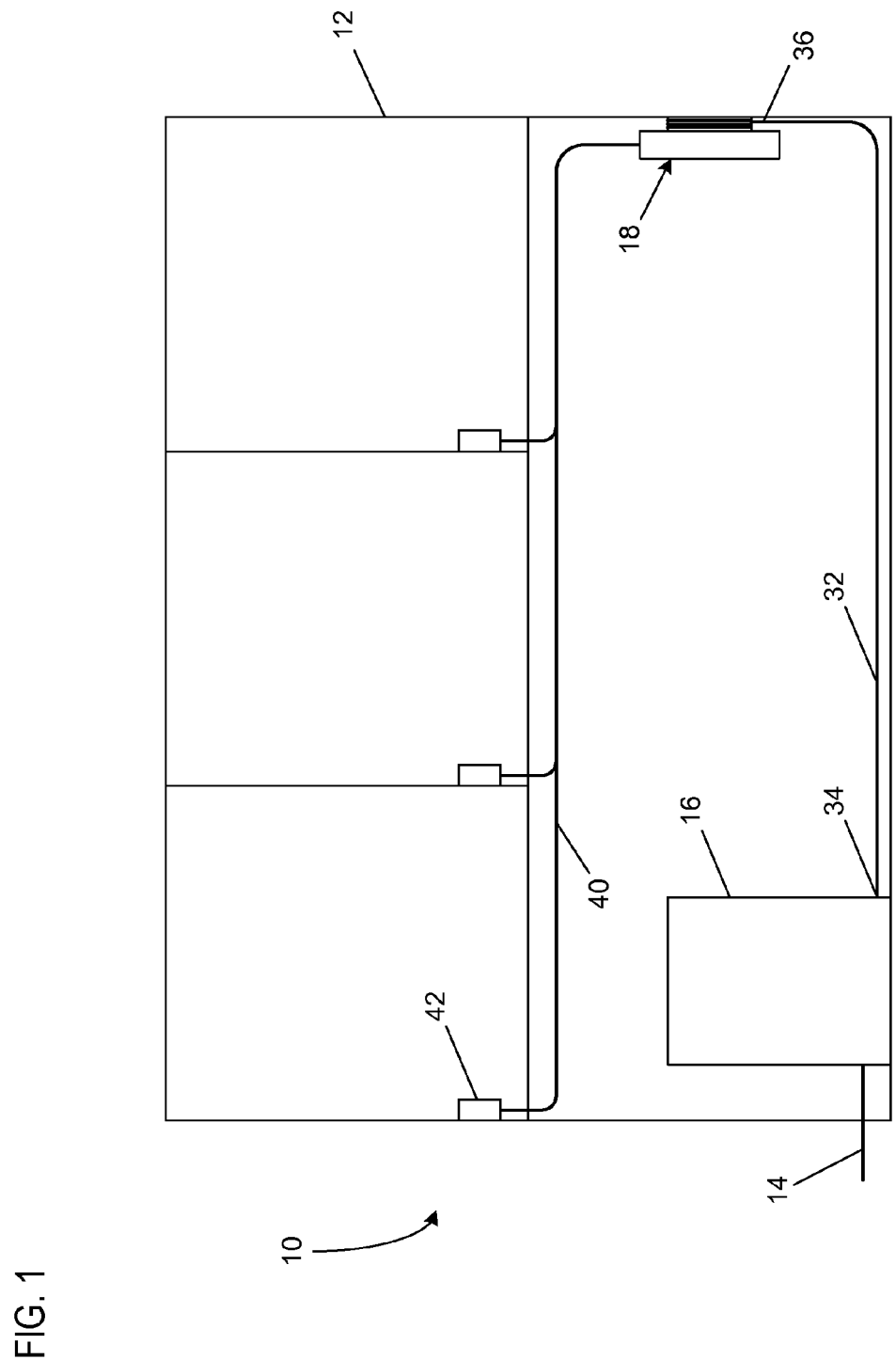
FIG. 1 is a schematic representation of a fiber optic network having exemplary features of aspects in accordance with the principles of the present disclosure.

Referring now to FIG. 1, a schematic representation of an exemplary fiber optic network, generally designated 10, is shown. In the depicted embodiment, the fiber optic network 10 is disposed in a facility 12 (e.g., individual residence, apartment complex, condominium, business, etc.). The fiber optic network 10 includes a feeder cable 14 that is in optical communication with a central office (not shown). The feeder cable 14 enters a distribution device 16 (e.g., a fiber distribution hub, a network interface device, etc.) that includes one or more optical splitters (e.g., 1-to-8 splitters, 1-to-16 splitters, 1-to-32 splitters, etc.). The optical splitters split the feeder cable 14 into a plurality of individual fibers. In the depicted embodiment, the distribution device 16 is disposed in the facility 12. In an alternate embodiment, the distribution device 16 is disposed outside the facility 12.

The facility 12 includes a fiber optic enclosure 18. A fiber optic enclosure suitable for use in the facility 12 has been described in U.S. Pat. No. 7,715,679, the disclosure of which is hereby incorporated by reference in its entirety.

Referring now to FIGS. 1-4, the fiber optic enclosure 18 defines an interior region 20. A plurality of fiber optic adapters 22 is disposed in the interior region 20 of the fiber optic enclosure 18. In one embodiment, the fiber optic adapters 22 are SC-type adapters. SC-type adapters have been described in U.S. Pat. No. 5,317,663, which is hereby incorporated by reference in its entirety. Each of the fiber optic adapters 22 includes a main body 24 having a first side 26 and an oppositely disposed second side 28. The first and second sides 26, 28 are adapted to receive connectorized ends of optical fibers.

Figure 2:
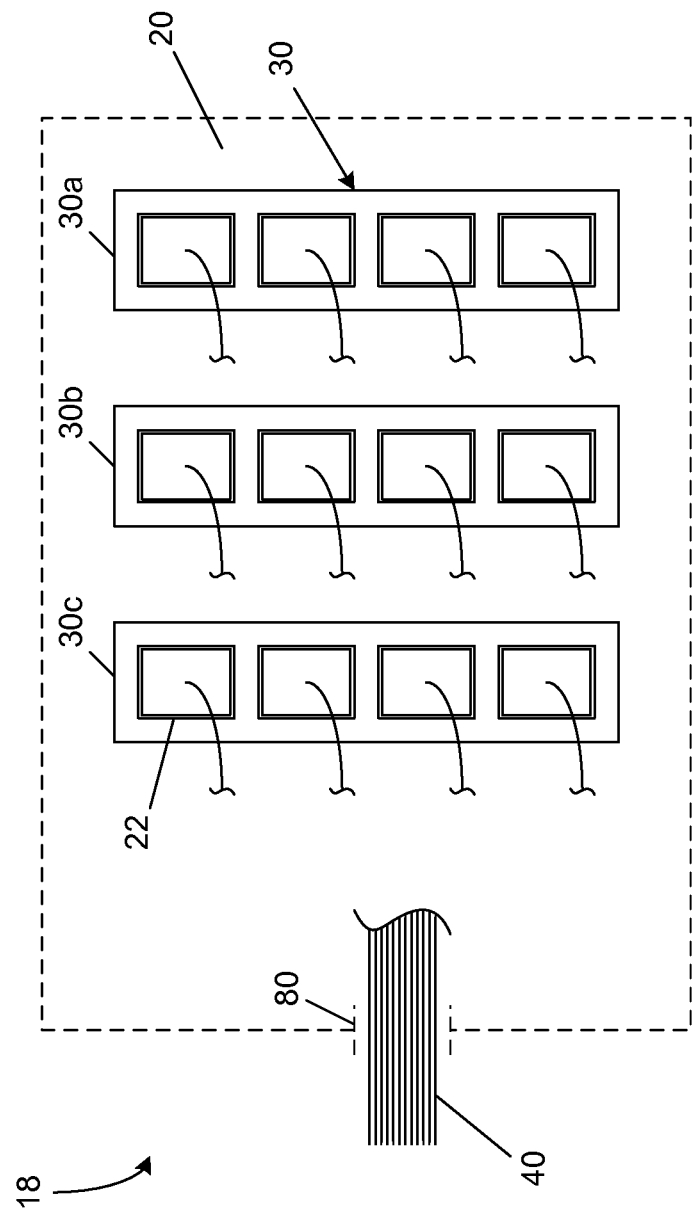
FIG. 2 is a schematic representation of a fiber optic enclosure suitable for use in the fiber optic network of FIG. 1.
Figure 3:
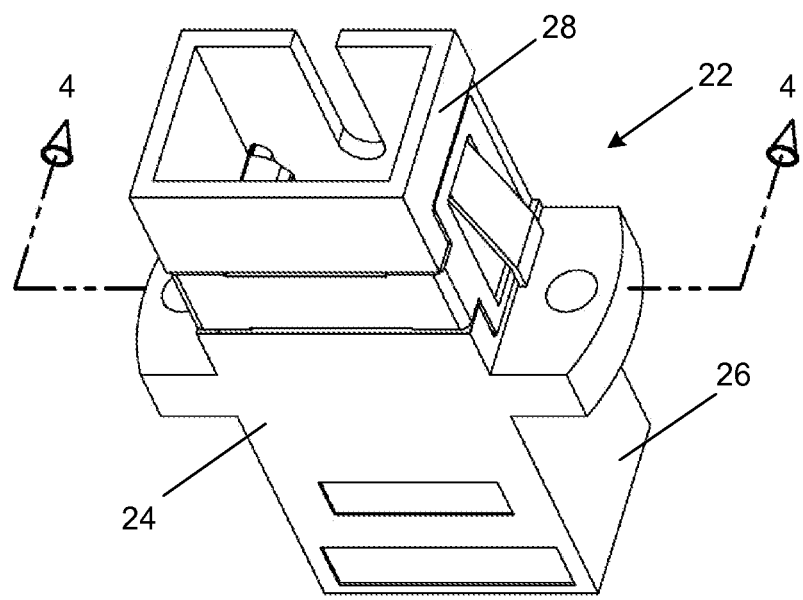
FIG. 3 is a perspective view of a fiber optic adapter suitable for use in the fiber optic enclosure of FIG. 2.
Figure 4:
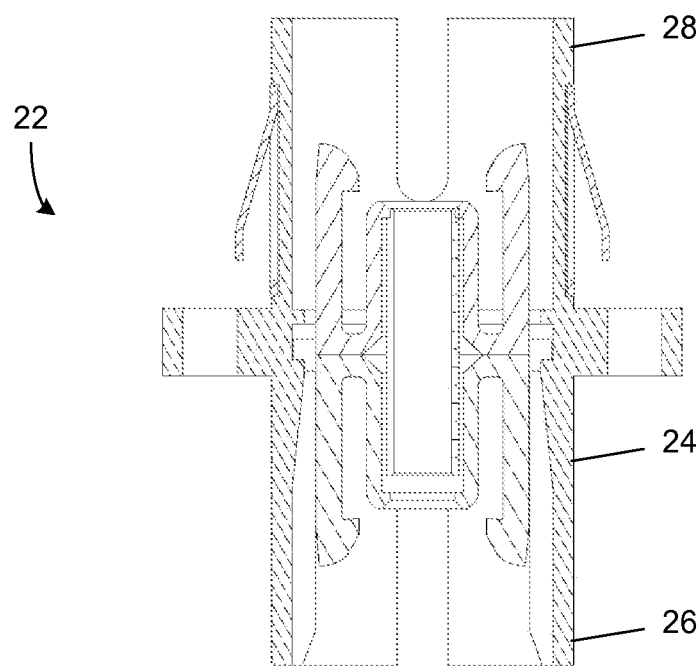
FIG. 4 is a cross-sectional view of the fiber optic adapter taken on line 4-4 of FIG. 3.

In one embodiment, the plurality of fiber optic adapters 22 is disposed on a plurality of adapter modules 30 (shown schematically in FIG. 2). In one embodiment, the plurality of adapter modules 30 is a plurality of sliding adapter modules. Sliding adapter modules have been described in U.S. Pat. Nos. 5,497,444, 5,717,810, 6,491,051 and 7,416,349, the disclosures of which are hereby incorporated by reference in their entirety.

In one aspect of the present disclosure, there are N number of adapter modules 30 disposed in the interior region 20 of the fiber optic enclosure 18 with each adapter module 30 including M number of fiber optic adapters 22. In the depicted embodiment of FIG. 2, there are three (N=3) adapter modules 30 with each adapter module 30 including four (M=4) fiber optic adapters 22.

A distribution cable 32 extends between the distribution device 16 and the fiber optic enclosure 18. The distribution cable 32 may be disposed on a cable spool that is disposed on the fiber optic enclosure 18 prior to being routed to the distribution device 16. In one embodiment, the distribution cable 32 includes multiple optical fibers. The distribution cable 32 includes a first end 34 and an oppositely disposed second end 36. The first end 34 enters the distribution device 16 and is in optical communication with the plurality of individual fibers from the optical splitters.

The second end 36 of the distribution cable 32 enters the fiber optic enclosure 18. In one embodiment, the second end 36 of the first cable 32 is connectorized. The connectorized ends of the optical fibers of the distribution cable 32 are engaged with the first sides 26 of the fiber optic adapters 22 disposed in the interior region 20 of the fiber optic enclosure 18.

A fiber optic cable 40 (e.g., a subscriber cable) extends between the fiber optic enclosure 18 and an end location 42. In the depicted embodiment of FIG. 1, a plurality of fiber optic cables 40 extends between the fiber optic enclosure 18 and a plurality of end locations 42.

Figure 5:
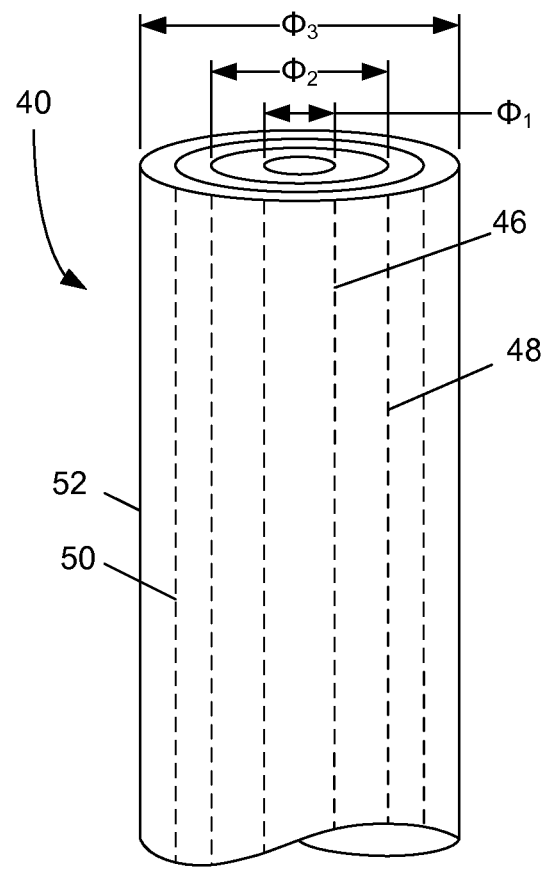
FIG. 5 is a fragmentary perspective view of a fiber optic cable.

Referring now to FIG. 5, an exemplary fiber optic cable 40 is shown. The fiber optic cable 40 includes an optical fiber 46, a buffer layer 48, a strength layer 50 and an outer jacket 52.

The optical fiber 46 includes a core. The core is made of a glass material, such as a silica-based material, having a first index of refraction. In the subject embodiment, the core has an outer diameter of less than or equal to about 10 µm.

The core of the optical fiber 46 is surrounded by a cladding that is also made of a glass material, such as a silica based-material. The cladding defines a second index of refraction that is less than the first index of refraction defined by the core. This difference between the first index of refraction of the core and the second index of refraction of the cladding allows an optical signal that is transmitted through the optical fiber 46 to be confined to the core. In the subject embodiment, the cladding has an outer diameter of less than or equal to about 125 µm.

A coating surrounds the cladding. The coating includes an inner layer and an outer layer. In the subject embodiment, the inner layer of the coating is immediately adjacent to the cladding such that the inner layer surrounds the cladding. The inner layer is a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the inner layer functions to protect the optical fiber 46 from microbending.

The outer layer of the coating is a polymeric material having a higher modulus of elasticity than the inner layer. In the subject embodiment, the outer layer of the coating is immediately adjacent to the inner layer such that the outer layer surrounds the inner layer. The higher modulus of elasticity of the outer layer functions to mechanically protect and retain the shape of optical fiber 46 during handling. In the subject embodiment, the outer layer defines an outer diameter $\phi_1$ of less than or equal to about 250 µm. In another embodiment, the outer diameter $\phi_1$ of the outer layer is in the range of about 242 µm to about 245 µm. In another embodiment, the outer layer defines an outer diameter $\phi_1$ of less than or equal to about 200 µm.

In one embodiment, the optical fiber 46 is manufactured to reduce the sensitivity of the optical fiber 46 to micro or macro-bending (hereinafter referred to as "bend insensitive"). Exemplary bend insensitive optical fibers 46 have been described in U.S. Pat. Nos. 7,587,111 and 7,623,747, the disclosures of which are hereby incorporated by reference in their entirety. An exemplary bend insensitive optical fiber 46 suitable for use in the fiber optic cable 40 of the present disclosure is commercially available from Draka Comteq under the name BendBright XS.

The buffer layer 48 is depicted as a tight layer that surrounds the optical fiber 46. It will be understood, however, that the scope of the present disclosure is not limited to the buffer layer 48 being a tight layer.

The buffer layer 48 can have any number of conventionally known constructions. For example, the buffer layer 48 can be made of a polymeric material such as polyvinyl chloride (PVC). Other polymeric materials (e.g., polyethylenes, polyurethanes, polypropylenes, polyvinylidene fluorides, ethylene vinyl acetate, nylon, polyester, or other materials) may also be used. In the subject embodiment, the buffer layer 48 defines an outer diameter $\phi_2$ that is less than or equal to about 1 mm. In another embodiment, the outer diameter $\phi_2$ of the buffer layer 48 is less than or equal to about 900 µm.

The strength layer 50 is adapted to inhibit axial tensile loading from being applied to the optical fiber 46. In the subject embodiment, the first strength layer 50 extends the length of the fiber optic cable 40 and is disposed in a generally longitudinal direction along the fiber optic cable 40 between the buffer layer 48 and the outer jacket 52. In certain embodiment, the strength layer 50 can include yarns, fibers, threads, tapes, films, epoxies, filaments or other structures. In a preferred embodiment, the strength layer 50 includes a plurality of aramid yarns (e.g., KEVLAR® yarns).

The outer jacket 52 surrounds the strength layer 50. In one embodiment, the outer jacket 52 includes an outer diameter that is less than or equal to about 4 mm. In the subject embodiment, the outer jacket 52 includes an outer diameter $\phi_3$ that is less than or equal to about 3 mm. In another embodiment, the outer diameter $\phi_3$ of the outer jacket 52 is less than or equal to about 2 mm. In another embodiment, the outer diameter $\phi_3$ of the outer jacket 52 is equal to about 1.65 mm.

In the subject embodiment, the outer jacket 52 includes a base material. In one embodiment, the base material is a polymer material such as a flexible chain polymer (i.e., one in which successive units of the polymer chain are free to rotate with respect to one another, so that the polymer chain can assume a random shape). Example base materials include conventional thermoplastic polymers such as polyethylene, polypropylene, ethylene-propylene, copolymers, polystyrene, and styrene copolymers, polyvinyl chloride, polyamide (nylon), polyesters such as polyethylene terephthalate, polyetheretherketone, polyphenylene sulfide, polyetherimide, polybutylene terephthalate, low smoke zero halogens polyolefins and polycarbonate, as well as other thermoplastic materials. Additives may also be added to the material. Example additives include pigments, fillers, coupling agents, flame retardants, lubricants, plasticizers, ultraviolet stabilizers or other additives. The base material can also include combinations of the above materials as well as combinations of other materials.

In one embodiment, the outer jacket 52 has a structure adapted to resist post-extrusion shrinkage. In this embodiment, the outer jacket 52 includes a plurality of discrete shrinkage-reduction members (e.g., rods, tendrils, extensions, fibers, etc.) embedded within the base material. Shrinkage-reduction members suitable for use with the fiber optic cable 40 have been described in U.S. Pat. No. 7,379,642, the disclosure of which is hereby incorporated by reference in its entirety. When the base material is stretched, the base material retains a memory of the pre-stretched shape and will gravitate towards the pre-stretched shape when reheated. The shrinkage-reduction members preferably demonstrate less shrinkage than the base material when reheated. Because the shrinkage-reduction members are embedded in the base material, the shrinkage-reduction members provide reinforcement that resists shrinkage of the base material. In a preferred embodiment, the shrinkage-reduction material has a melting temperature that is greater than the melting temperature of the base material.

The shrinkage-reduction members are preferably elongated and have lengths that are aligned generally parallel to a longitudinal axis of the fiber optic cable 40. Each of the shrinkage-reduction members preferably does not extend the entire length of the fiber optic cable 40. Instead, each of the shrinkage-reduction members preferably coincides with or extends along only a relatively short segment of the total length of the fiber optic cable 40. For example, in one embodiment, at least some of the shrinkage-reduction members have lengths in the range of 0.2 mm-100 mm. In another embodiment, at least some of the shrinkage-reduction members have lengths in the range of 5-60 mm. In still another embodiment, at least some of the shrinkage-reduction members have lengths in the range of about 10-40 mm. In certain embodiments, a majority of the shrinkage-reduction members provided within the base material can be within the size ranges provided above, or within other size ranges. Additionally, most of the shrinkage-reduction members are preferably discrete or separate from one another. For example, many of the shrinkage-reduction members are preferably separated or isolated from one another by portions of the base material.

To further promote flexibility, the concentration of the shrink-reduction members is relatively small as compared to the base material. For example, in one embodiment, the shrink-reduction material constitutes less than 2% of the total weight of the outer jacket 52. In another embodiment, the shrink-reduction material constitutes less than 1.5% of the total weight of the outer jacket 52. In still another embodiment, the shrink-reduction material constitutes less than or equal to 1.25% of the total weight of the outer jacket 52. In a further embodiment, the shrink-reduction material constitutes less than or equal to 1.0% of the total weight of the outer jacket 52. While preferred embodiments use less than 2% of the shrink-reduction material by weight, other embodiments within the scope of the present invention can use more than 2% by weight of the shrink-reduction material.

In one embodiment, the shrinkage-reduction members are made from a material that can be softened and reshaped in the extrusion process. In a preferred embodiment, the shrinkage-reduction members include liquid crystal polymers. Example liquid crystal polymers are described in U.S. Pat. Nos. 3,991,014; 4,067,852; 4,083,829; 4,130,545; 4,161,470; 4,318,842; and 4,468,364, which are hereby incorporated by reference in their entireties. Liquid crystal polymers are polymers that are anisotropic and highly oriented, even in a softened or liquid phase.

Figure 6:
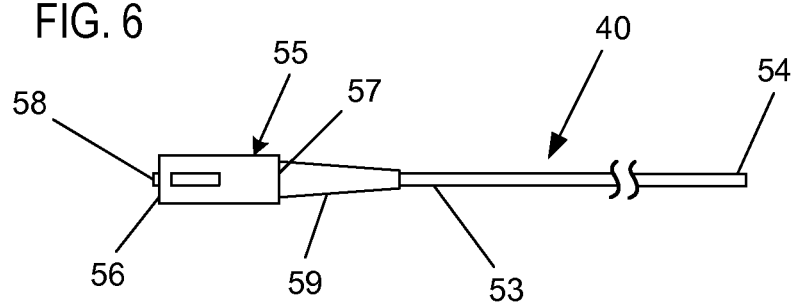
FIG. 6 is a perspective view of a connector suitable for use with the fiber optic cable of FIG. 5.

Referring now to FIG. 6, each of the fiber optic cables 40 includes a first axial end 53 and an oppositely disposed second axial end 54. The first axial end 53 of the fiber optic cable 40 includes a connector 55. The connector 55 is adapted to be received in the second side 28 of one of the fiber optic adapters 22. In the subject embodiment, the connector 55 disposed at the first axial end 53 of each of the fiber optic cables 40 is an SC-type connector.

The connector 55 includes a first end 56 and an oppositely disposed second end 57. The first end 56 is adapted for insertion into the fiber optic adapter 22. The first end 56 includes a ferrule 58 in which the optical fiber 46 of the fiber optic cable 40 is mounted.

The fiber optic cable 40 extends outwardly from the second end 57 of the connector 55. In the depicted embodiment, the second end 57 includes a strain relief boot 59. The strain relief boot 59 is adapted to protect the fiber optic cable 40 at the second end 57 of the connector from bending.

Figure 8:
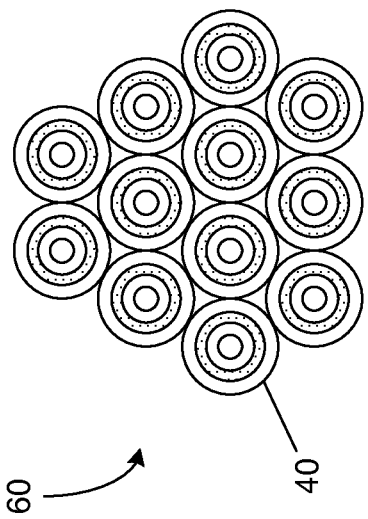
FIG. 8 is a cross-sectional view of the fiber optic cable bundle taken on line 8-8 of FIG. 7.
Figure 7:
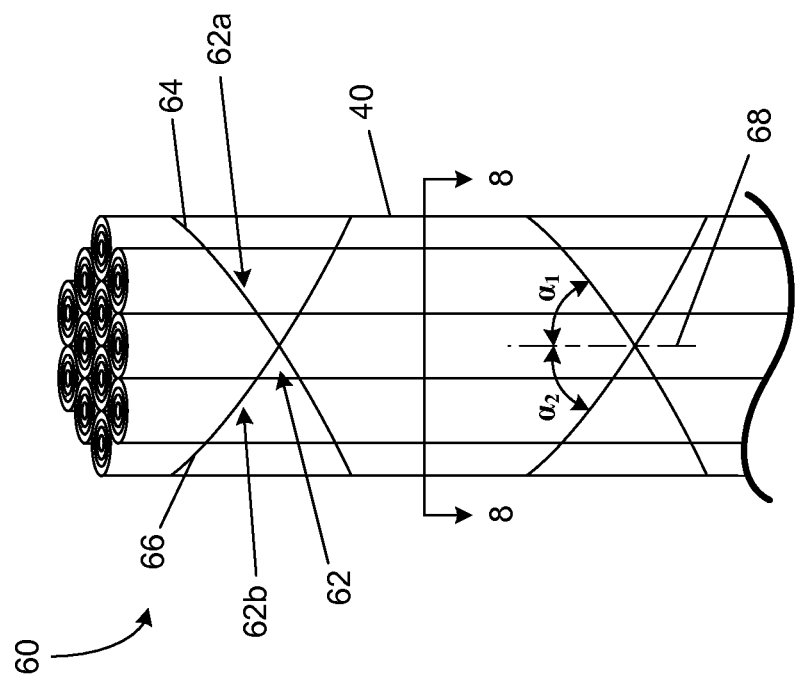
FIG. 7 is a fragmentary perspective view of a fiber optic cable bundle suitable for use with the fiber optic network of FIG. 1.
Figure 9:
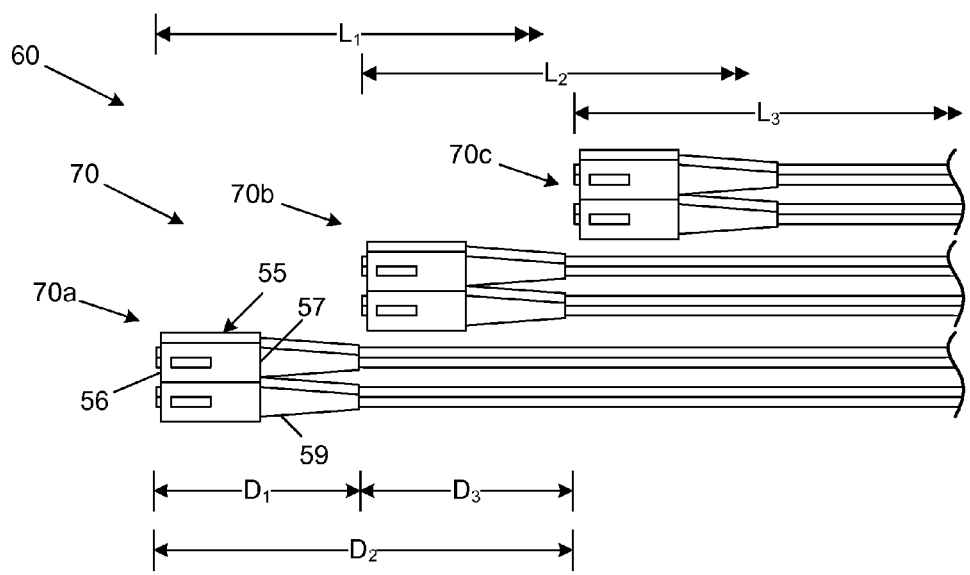
FIG. 9 is a perspective view of the fiber optic cable bundle.

Referring now to FIGS. 7-9, a fiber optic cable bundle 60 is shown. The fiber optic cable bundle 60 includes a first end portion 61a and an oppositely disposed second end portion 61b. The fiber optic cable bundle 60 includes a plurality of fiber optic cables 40. In the depicted embodiment, the total number (or total quantity) of fiber optic cables 40 in the fiber optic cable bundle 60 is equal to the total number (N·M) of fiber optic adapters 22 in the enclosure 18. In another embodiment, the total number (or total quantity) of fiber optic cables 40 in the fiber optic cable bundle 60 is a portion of the total number of fiber optic adapters 22 in the enclosure 18.

In the depicted embodiment of FIGS. 7-9, the fiber optic cable bundle 60 includes twelve fiber optic cables 40. As shown in FIGS. 7 and 8, three of the fiber optic cables 40 are disposed in the center of the fiber optic cable bundle 60 while the remaining nine fiber optic cables 40 are disposed about the three fiber optic cables 40 so the nine fiber optic cables 40 are disposed at the outside of the fiber optic cable bundle 60.

Referring now to FIG. 7, the fiber optic cables 40 of the fiber optic cable bundle 60 are held together by a plurality of binder members 62. In one embodiment, the plurality of binder members 62 is strands of aramid yarn. In another embodiment, the plurality of binder members 62 is ribbonized fiberglass.

In the subject embodiment, the binder members 62 include a first set of binder members 62a and a second set of binder members 62b. In one embodiment, each of the first and second sets of binder members 62a, 62b includes one to ten binder members. In another embodiment, each of the first and second sets of binder members 62a, 62b includes one to eight binder members. In another embodiment, each of the first and second sets of binder members 62a, 62b includes four binder members.

In the depicted embodiment of FIG. 7, the first set of binder members 62a includes a first binder member 64 while the second set of binder members 62b includes a second binder member 66. In the subject embodiment, the second binder member 66 is disposed over the first binder member 64 such that the first and second binder members 64, 66 are unbraided or nonwoven.

In the subject embodiment, the first and second binder members 64, 66 are contra-helically served. For example, in the depicted embodiment of FIG. 7, the first binder member 64 is disposed about the fiber optic cables 40 in a generally right-handed helical configuration while the second binder member 66 is disposed over the first binder member 64 in a generally left-handed helical configuration. The first and second binder members 64, 66 are disposed at angles $\alpha_1$, $\alpha_2$ from a longitudinal line 68. In one embodiment, the angles $\alpha_1$, $\alpha_2$ are equal but opposite. In another embodiment, the angles $\alpha_1$, $\alpha_2$ are in the range of about 0.1 degrees to about 60 degrees. In another embodiment, the angles $\alpha_1$, $\alpha_2$ are in the range of about 5 degrees to about 45 degrees. In another embodiment, the angles $\alpha_1$, $\alpha_2$ are in the range of about 0.1 degrees to about 30 degrees.

In the subject embodiment, each of the binder members 62 has a lay length in a range of about 1 inch to about 18 inches. The lay length is the axial distance in which each of the binder members 62 wraps 360° around the fiber optic cable bundle 60.

Figure 10:
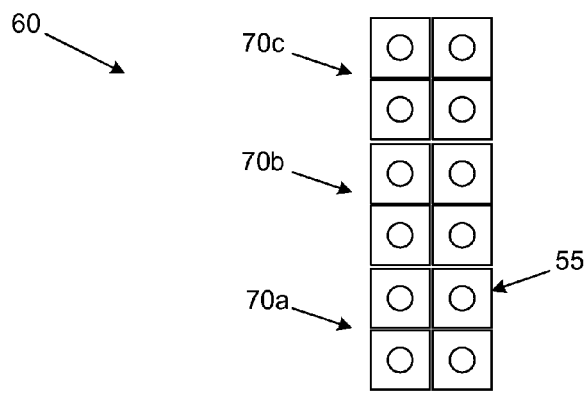
FIG. 10 is an end view of the fiber optic cable bundle of FIG. 9.

Referring now to FIGS. 2, 9 and 10, the fiber optic cables 40 in the fiber optic cable bundle 60 are disposed in a plurality of groups 70. In the depicted embodiment of FIG. 9, the fiber optic cables 40 in the fiber optic cable bundle 60 are disposed in a first group 70a, a second group 70b and a third group 70c.

The total number (or total quantity) of fiber optic cables 40 in each group 70 is equal to at least a portion of the total number of fiber optic adapters 22 per adapter module 30. For example, in the depicted embodiment of FIG. 2, each adapter module 30 includes four fiber optic adapters 22. In the depicted embodiment of FIGS. 9 and 10, each group 70 of fiber optic cables 40 in the fiber optic cable bundle 60 includes four fiber optic cables 40. Therefore, in the depicted embodiments, the total number (or total quantity) of fiber optic cables 40 in each group 70 is equal to the total number (or total quantity) of fiber optic adapters 22 in one of the adapter modules 30.

The groups 70 of the fiber optic cable bundle 60 are axially staggered relative to one another. In the depicted embodiment of FIG. 9, the connectors 55 of the first group 70a are axially offset from the connectors 55 of the second and third groups 70b, 70c at the first end portion 61a of the fiber optic cable bundle 60 so that the first group 70a extends axially outward from the second and third groups 70b, 70c. The first ends 56 of the connectors 55 of the first group 70a are axially offset from the first ends 56 of the connectors 55 of the second group 70b by a first axial offset distance $D_1$ at the first end portion 61a of the fiber optic cable bundle 60.

In the depicted embodiment, the first ends 56 of the connectors 55 of the second group 70b are axially adjacent to the second ends 57 of the connectors 55 of the first group 70a at the first end portion 61a of the fiber optic cable bundle 60. In the depicted embodiment, the first ends 56 of the connectors 55 of the second group 70b are axially adjacent to the strain relief boots 59 of the second ends 57 of the connectors 55 of the first group 70a.

In one embodiment, the first axial offset distance $D_1$ is greater than or equal to about 1 inch. In another embodiment, the first axial offset distance $D_1$ is greater than or equal to about 1.5 inches. In another embodiment, the first axial offset distance $D_1$ is greater than or equal to about 2.0 inches.

The first ends 56 of the connectors 55 of the first group 70a are axially offset from the first ends 56 of the connectors 55 of the third group 70c by a second axial offset distance $D_2$ at the first end portion 61a of the fiber optic cable bundle 60. In one embodiment, the second axial offset distance $D_2$ is greater than or equal to about 2 inches. In another embodiment, the second axial offset distance $D_2$ is greater than or equal to about 3 inches. In another embodiment, the second axial offset distance $D_2$ is greater than or equal to about 4 inches.

In the depicted embodiment, the first axial offset distance $D_1$ is less than the second axial offset distance $D_2$. In one embodiment, the first axial offset distance $D_1$ is about 50% of the second axial offset distance $D_2$.

The second group 70b is disposed in the fiber optic cable bundle 60 so that the connectors 55 of the second group 70b are axially between the connectors 55 of the first group 70a and the connectors 55 of the third group 70c. In the depicted embodiment of FIG. 9, the connectors 55 of the second group 70b are axially offset from the connectors 55 of the third group 70c so that the second group 70b extends axially outward from the third group 70c at the first end portion 61a of the fiber optic cable bundle 60. The first ends 56 of the connectors 55 of the second group 70b are axially offset from the first ends 56 of the connectors 55 of the third group 70c by a third axial offset distance $D_3$ at the first end portion 61a of the fiber optic cable bundle 60.

In the depicted embodiment, the first ends 56 of the connectors 55 of the third group 70c are axially adjacent to the second ends 57 of the connectors 55 of the second group 70b. In the depicted embodiment, the first ends 56 of the connectors 55 of the third group 70c are axially adjacent to the strain relief boots 59 of the second ends 57 of the connectors 55 of the second group 70b.

In one embodiment, the third axial offset distance $D_3$ is greater than or equal to about 1 inch. In another embodiment, the third axial offset distance $D_3$ is greater than or equal to about 1.5 inches. In another embodiment, the third axial offset distance $D_3$ is greater than or equal to about 2.0 inches. In another embodiment, the third axial offset distance $D_3$ is equal to the first axial offset distance $D_1$.

Referring now to FIGS. 2 and 9, the fiber optic cable bundle 60 is routed to the enclosure 18. The first group 70a of fiber optic cables 40 in the fiber optic cable bundle 60 is routed to fiber optic adapters 22 in a first adapter module 30a. The second group 70b of fiber optic cables 40 in the fiber optic cable bundle 60 is routed to fiber optic adapters 22 in a second adapter module 30b. The third group 70c of fiber optic cables 40 in the fiber optic cable bundle 60 is routed to fiber optic adapters 22 in a third adapter module 30c.

In the subject embodiment, the first adapter module 30a is disposed the farthest distance from an opening 80 in the enclosure 18 through which the fiber optic cable bundle 60 enters the enclosure out of the first, second and third adapter modules 30a, 30b, 30c. The third adapter module 30c is disposed closest to the opening 80 out of the first, second and third adapter modules 30a, 30b, 30c while the second adapter module 30b is disposed between the first and third adapter modules 30a, 30c.

In one aspect of the present disclosure, the first, second and third axial offset distances $D_1$, $D_2$, $D_3$ account for the spacing between the first, second and third adapter modules 30a, 30b, 30c. In the depicted embodiment, the spacing between the first and second adapter modules 30a, 30b is less than or equal to about the first axial offset distance $D_1$. The spacing between the second and third adapter modules 30b, 30c is less than or equal to about the third axial offset distance $D_3$. The spacing between the first and third adapter modules 30a, 30c is less than or equal to the second axial offset distance $D_2$.

In an embodiment in which the second ends 54 of the fiber optic cables 40 are field terminated, the fiber optic cables 40 are disposed in the fiber optic cable bundle 60 so that a length $L_1$ of the first group 70a of fiber optic cables 40 of the fiber optic cable bundle 60 is greater than a length $L_2$ of the second group 70b and a length $L_3$ of the third group 70c. The length $L_2$ of the second group 70b of fiber optic cable 40 of the fiber optic cable bundle 60 is greater than the length $L_3$.

Figure 12:
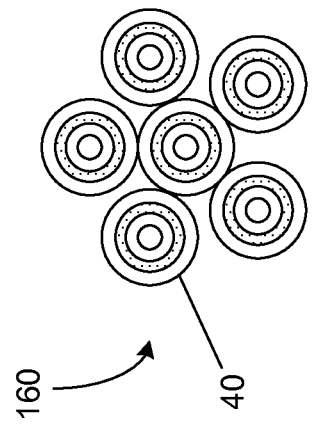
FIG. 12 is a cross-sectional view of the first fiber optic cable bundle taken on line 12-12 of FIG. 11.
Figure 11:
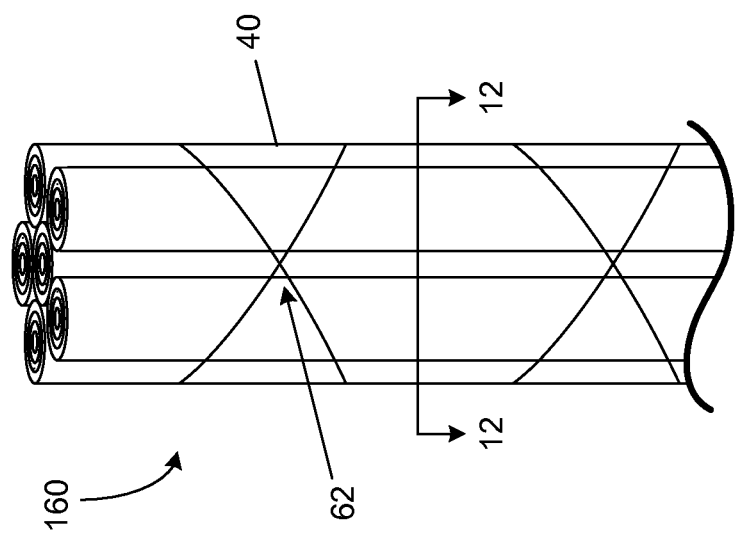
FIG. 11 is a fragmentary perspective view of a first fiber optic cable bundle suitable for use with the fiber optic network of FIG. 1.

Referring now to FIGS. 11 and 12, a first fiber optic cable bundle 160 is shown. The first fiber optic cable bundle 160 includes fiber optic cables 40. The total number (or total quantity) of fiber optic cables 40 in the first fiber optic cable bundle 160 is equal to a portion of the total number (N·M) of fiber optic adapters 22 in the enclosure 18. In the depicted embodiment, the total number (or total quantity) of fiber optic cables 40 in the first fiber optic cable bundle 160 is equal to about 50% of the total number of fiber optic adapter 22 in the enclosure 18.

In the depicted embodiment of FIGS. 11 and 12, the first fiber optic cable bundle 160 includes six fiber optic cables 40. As shown in FIGS. 11 and 12, one of the fiber optic cables 40 is disposed in the center of the first fiber optic cable bundle 160 while the remaining five fiber optic cables 40 are disposed about the one fiber optic cable 40 so the five fiber optic cables 40 are disposed at the outside of the first fiber optic cable bundle 160. The fiber optic cables 40 of the first fiber optic cable bundle 160 are held together by the plurality of binder members 62.

Figure 13:
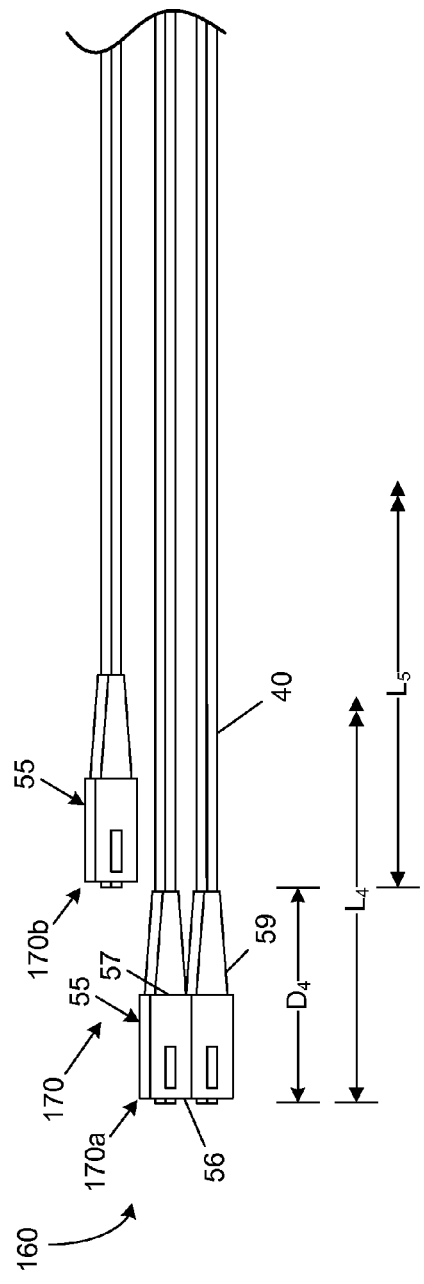
FIG. 13 is a perspective view of the first fiber optic cable bundle.
Figure 14:
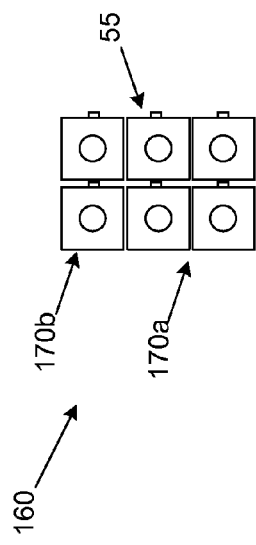
FIG. 14 is an end view of the first fiber optic cable bundle of FIG. 13.

Referring now to FIGS. 13 and 14, the fiber optic cables 40 of the first fiber optic cable bundle 160 are disposed in a plurality of groups 170. In the depicted embodiment of FIGS. 13 and 14, the fiber optic cables 40 in the first fiber optic cable bundle 160 are disposed in a first group 170a and a second group 170b.

In the depicted embodiment, the total number (or total quantity) of fiber optic cables 40 in the first group 170a is equal to the total number (or total quantity) of fiber optic adapters 22 in one of the adapter modules 30 while the number of fiber optic cables 40 in the second group 170b is equal to a portion of the total number of fiber optic adapters 22 in one of the adapter modules 30. In the subject embodiment, the total number (or total quantity) of fiber optic cables 40 in the second group 170b is equal to 50% of the total number of fiber optic adapters 22 in one of the adapter modules 30. In the depicted embodiment, the total number (or total quantity) of fiber optic cables 40 in the first group 170a is equal to four while the number of fiber optic cables 40 in the second group 170b is equal to two.

The groups 170 of the first fiber optic cable bundle 160 are axially staggered relative to one another. In the depicted embodiment of FIG. 13, the connectors 55 of the first group 170a are axially offset from the connectors 55 of the second group 170b so that the first group 170a extends axially outward from the second group 170b. The first ends 56 of the connectors 55 of the first group 170a are axially offset from the first ends 56 of the connectors 55 of the second group 170b by a fourth axial distance $D_4$.

In the depicted embodiment, the first ends 56 of the connectors 55 of the second group 170b are axially adjacent to the second ends 57 of the connectors 55 of the first group 170a. In the depicted embodiment, the first ends 56 of the connectors 55 of the second group 170b are axially adjacent to the strain relief boots 59 of the second ends 57 of the connectors 55 of the first group 170a.

In one embodiment, the fourth axial distance $D_4$ is greater than or equal to about 1 inch. In another embodiment, the fourth axial distance $D_4$ is greater than or equal to about 1.5 inches. In another embodiment, the fourth axial distance $D_4$ is greater than or equal to about 2.0 inches.

In an embodiment in which the second ends 54 of the fiber optic cables 40 of the fiber optic cable bundle 160 are field terminated, the fiber optic cables 40 in the first group 170a of the first fiber optic cable bundle 160 have a length $L_4$ while the fiber optic cables 40 in the second group 170b of the first fiber optic cable bundle 160 have a length $L_5$. The length $L_4$ of the first group 170a is greater than the length $L_5$ of the second group 170b.

Figure 15:
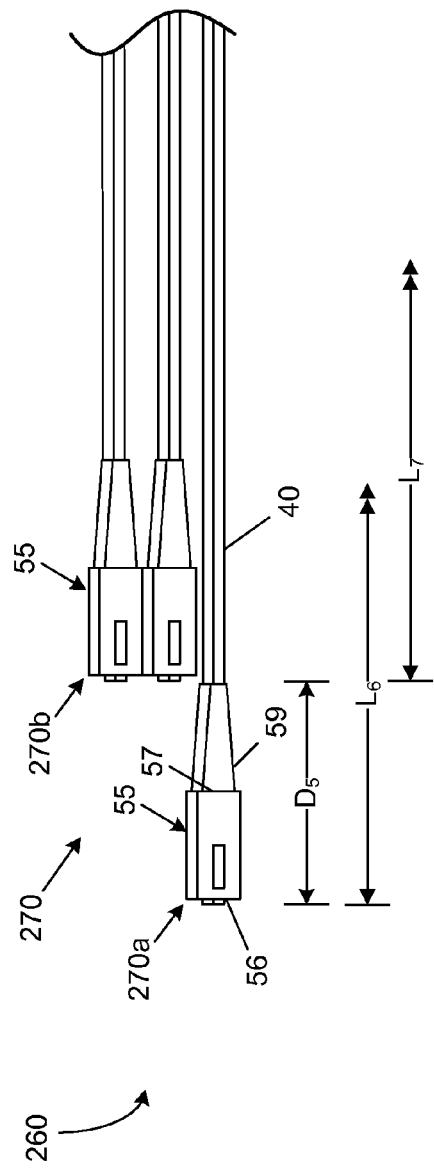
FIG. 15 is a perspective view of a second fiber optic cable bundle.
Figure 16:
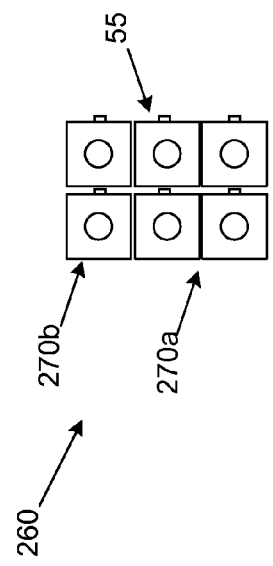
FIG. 16 is an end view of the second fiber optic cable bundle of FIG. 15.

Referring now to FIGS. 15 and 16, a second fiber optic cable bundle 260 is shown. The second fiber optic cable bundle 260 includes fiber optic cables 40. The total number (or total quantity) of fiber optic cables 40 in the second fiber optic cable bundle 260 is equal to a portion of the total number (N·M) of fiber optic adapters 22 in the enclosure 18. In the depicted embodiment, the total number (or total quantity) of fiber optic cables 40 in the second fiber optic cable bundle 160 is equal to about 50% of the total number of fiber optic adapter 22 in the enclosure 18.

The fiber optic cables 40 of the second fiber optic cable bundle 260 are disposed in a plurality of groups 270. In the depicted embodiment of FIGS. 15 and 16, the fiber optic cables 40 in the second fiber optic cable bundle 260 are disposed in a first group 270a and a second group 270b.

In the depicted embodiment, the total number (or total quantity) of fiber optic cables 40 in the first group 270a is equal to a portion of the total number of fiber optic adapters 22 in one of the adapter modules 30 while the total number (or total quantity) of fiber optic cables 40 in the second group 270b is equal to the total number of fiber optic adapters 22 in one of the adapter modules 30. In the subject embodiment, the total number (or total quantity) of fiber optic cables 40 in the first group 270a is equal to 50% of the total number of fiber optic adapters 22 in one of the adapter modules 30. In the depicted embodiment, the total number (or total quantity) of fiber optic cables 40 in the first group 270a is equal to two while the total number (or total quantity) of fiber optic cables 40 in the second group 270b is equal to four.

The groups 270 of the second fiber optic cable bundle 260 are axially staggered relative to one another. In the depicted embodiment of FIG. 15, the connectors 55 of the first group 270a are axially offset from the connectors 55 of the second group 270b so that the first group 270a extends axially outward from the second group 270b. The first ends 56 of the connectors 55 of the first group 270a are axially offset from the first ends 56 of the connectors 55 of the second group 270b by a fifth axial distance $D_5$.

In the depicted embodiment, the first ends 56 of the connectors 55 of the second group 270b are axially adjacent to the second ends 57 of the connectors 55 of the first group 270a. In the depicted embodiment, the first ends 56 of the connectors 55 of the second group 270b are axially adjacent to the strain relief boots 59 of the second ends 57 of the connectors 55 of the first group 270a.

In one embodiment, the fifth axial distance $D_5$ is about equal to the fourth axial distance $D_4$. In another embodiment, the fifth axial distance $D_5$ is greater than or equal to about 1 inch. In another embodiment, the fifth axial distance $D_5$ is greater than or equal to about 1.5 inches. In another embodiment, the fifth axial distance $D_5$ is greater than or equal to about 2.0 inches.

In an embodiment in which the second ends 54 of the fiber optic cables 40 of the fiber optic cable bundle 260 are field terminated, the fiber optic cables 40 in the first group 270a of the second fiber optic cable bundle 260 have a length $L_6$ while the fiber optic cables 40 in the second group 270b of the second fiber optic cable bundle 260 have a length $L_7$. The length $L_6$ of the first group 270a is greater than the length $L_7$ of the second group 270b. In one aspect of the present disclosure, the length $L_6$ of the fiber optic cables 40 of the first group 270a of the second fiber optic cable bundle 260 is equal to the length $L_5$ of the fiber optic cables 40 of the second group 170b of the first fiber optic cable bundle 160.

Referring now to FIGS. 2, 13 and 15, the first and second fiber optic cable bundles 160, 260 are adapted to be routed to the enclosure 18. The first group 170a of fiber optic cables 40 in the first fiber optic cable bundle 160 is routed to fiber optic adapters 22 in a first adapter module 30a. The second group 170b of fiber optic cables 40 in the first fiber optic cable bundle 160 is routed to fiber optic adapters 22 in a second adapter module 30b. The first group 270a of fiber optic cables 40 in the second fiber optic cable bundle 260 is routed to the remaining fiber optic adapters 22 in the second adapter module 30b while the second group 270b of fiber optic cables 40 in the second fiber optic cable bundle 260 is routed to fiber optic adapters 22 in a third adapter module 30c. As the first group 270a of the second fiber optic cable bundle 260 and the second group 170b of the first fiber optic cable bundle 160 are routed to the same adapter module 30, the lengths of the first group 270a of the second fiber optic cable bundle 260 and the second group 170b of the first fiber optic cable bundle 160 can equal.

The staggering of the groups 70, 170, 270 of fiber optic cables 40 in the fiber optic cable bundles 60, 160, 260 is potentially advantageous as it can allow for more fiber optic cables 40 to be disposed in the fiber optic cable bundle 60, 160, 260 and for that fiber optic cable bundle 60, 160, 260 to pass through a conduit. In one embodiment, the total number (or total quantity) of fiber optic cables 40 in a group 70, 170, 270 is determined based on the inner diameter of the conduit and the size of the connectors 55.

Figure 17:
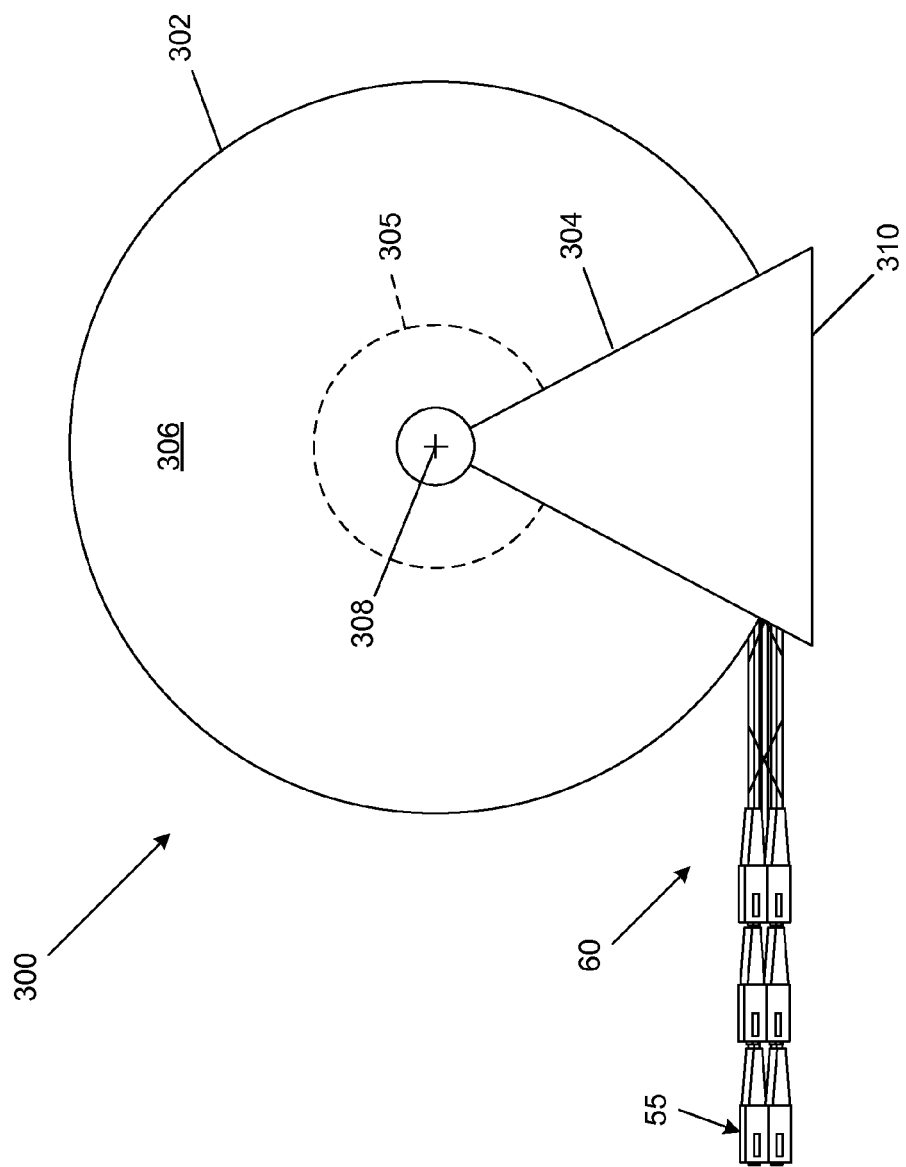
FIG. 17 is a side view of a cable spool assembly.

Referring now to FIG. 17, a cable spool assembly 300 is shown. The cable spool assembly 300 includes a cable spool 302 and a cable spool stand 304.

The cable spool 302 includes the fiber optic cable bundle 60 disposed about the cable spool 302. In one embodiment, the fiber optic cable bundle 60 is coiled about a drum 305 of the cable spool 302 that is disposed between flanges 306 of the cable spool 302. In one aspect of the present disclosure, the length of the fiber optic cable bundle 60 coiled about the drum 305 is less than or equal to about 500 feet.

The cable spool 302 is rotatably engaged to the cable spool stand 304 so that the cable spool 302 can selectively rotate about an axis 308 (shown as a "+" in FIG. 14) of the cable spool stand 304 that extends through the center of the cable spool 302.

The cable spool stand 304 is adapted to remain stationary as the cable spool 302 rotates about the axis 308. The cable spool stand 304 includes a base surface 310. With the base surface 310 disposed on the ground or other structure, the cable spool 302 can be rotated to deploy or pay out the fiber optic cable bundle 60.

Figure 18:
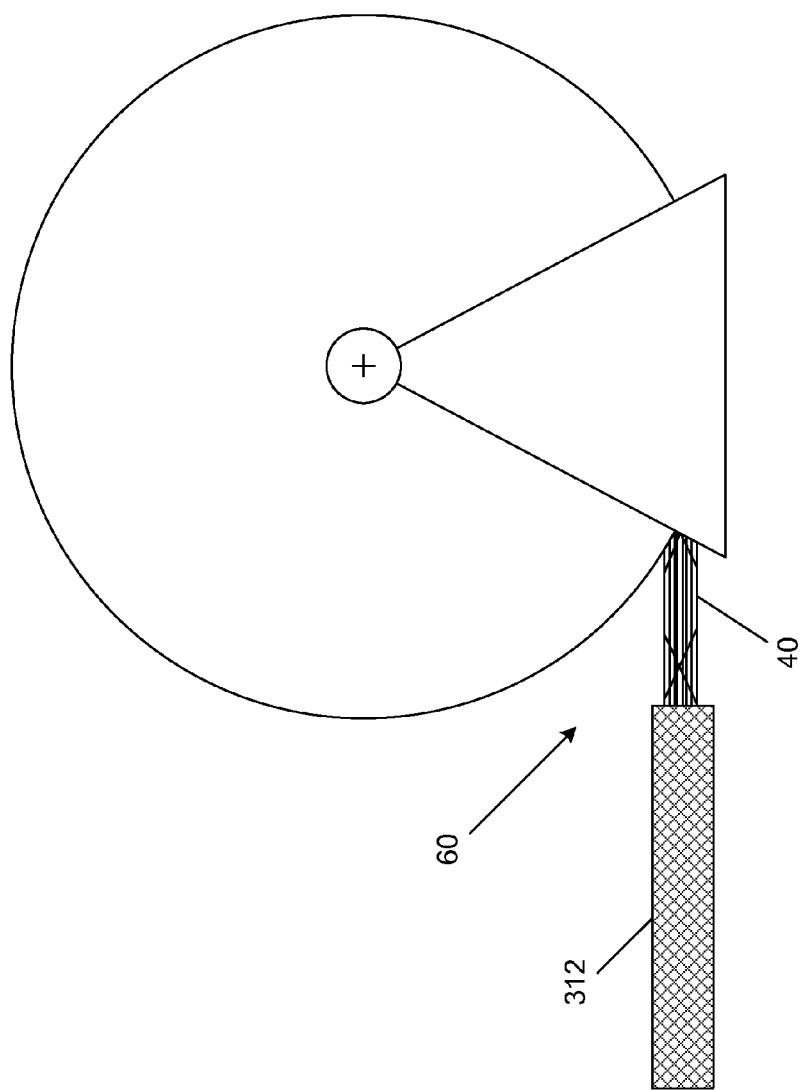
FIG. 18 is a side view of a cable spool assembly with a pulling eye.

Referring now to FIG. 18, the connectors 55 of the fiber optic cables 40 of the fiber optic cable bundle 60 are disposed in a protective pulling eye 312. In one embodiment, the pulling eye 312 is a flexible nylon mesh. The connectors 55 are disposed inside the nylon mesh 312. The nylon mesh 312 is then fixed to the fiber optic cable bundle 60 using an adhesive tape. In one embodiment, an end 314 of the nylon mesh 312 includes a loop for pulling the nylon mesh 312 through the conduit.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fiber optic cable bundle assembly comprising:
a fiber optic cable bundle having a first end portion and an oppositely disposed second end portion, the fiber optic cable bundle including:
a first group of fiber optic cables, each of the fiber optic cables in the first group having a first axial end and including a connector at the first axial end of the fiber optic cables in the first group;
a second group of fiber optic cables, each of the fiber optic cables in the second group having a first axial end and including a connector at the first axial end of the fiber optic cables in the second group;
wherein each of the fiber optic cables of the first and second groups includes an optical fiber, a strength layer, and a jacket surrounding the optical fiber and the strength layer; and
wherein the connectors of the second group are offset from the connectors of the first group by a first axial offset distance at the first end portion of the fiber optic cable bundle; and
a plurality of binder members contra-helically served about the fiber optic cable bundle.

2. The fiber optic cable bundle assembly of claim 1, wherein the connectors of the first and second groups are SC-type connectors.

3. The fiber optic cable bundle assembly of claim 1, wherein the first axial offset distance is greater than or equal to 2 inches.

4. The fiber optic cable bundle assembly of claim 1, wherein a total quantity of fiber optic cables in the fiber optic cable bundle is twelve.

5. The fiber optic cable bundle assembly of claim 1, wherein a total quantity of fiber optic cables in the first group is equal to a total quantity of fiber optic cables in the second group.

6. The fiber optic cable bundle assembly of claim 5, wherein the total quantity of fiber optic cables in the first group is equal to four.

7. The fiber optic cable bundle assembly of claim 1, wherein a total quantity of fiber optic cables in the second group is equal to half of a total quantity of the fiber optic cables in the first group.

8. The fiber optic cable bundle assembly of claim 7, wherein the total quantity of fiber optic cables in the first group is equal to four.

9. The fiber optic cable bundle assembly of claim 1, further comprising a third group of fiber optic cables, each of the fiber optic cables in the third group having a first axial end and including a connector at the first axial end, the connectors of the third group being offset from the connectors of the first group by a second axial offset distance at the first end portion of the fiber optic cable bundle, wherein the second axial offset distance is greater than the first axial offset distance.

10. The fiber optic cable bundle assembly of claim 9, wherein the second axial offset distance is greater than or equal to 4 inches.

11. The fiber optic cable bundle assembly of claim 1, wherein each of the binder members is aramid yarn.

12. A fiber optic cable assembly comprising:
   a cable spool having a drum portion;
   a fiber optic cable bundle assembly disposed about the drum portion of the cable spool, the fiber optic cable bundle assembly including:
      a fiber optic cable bundle having a first end portion and a second end portion, the fiber optic cable bundle including:
         a first group of fiber optic cables, each of the fiber optic cables in the first group having a first axial end disposed at the first end portion of the fiber optic cable bundle;
         a second group of fiber optic cables, each of the fiber optic cables in the second group having a first axial end disposed at the first end portion of the fiber optic cable bundle;
         wherein each of the fiber optic cables of the first and second groups includes an optical fiber, a strength layer, and a jacket surrounding the optical fiber and the strength layer; and
         wherein the first axial ends of the second group are axially offset from the first axial ends of the first group by a first axial offset distance; and
      a plurality of binder members contra-helically served about the fiber optic cable bundle, the plurality of binder members exposed to the drum portion of the cable spool.

13. The fiber optic cable assembly of claim 12, wherein a total quantity of fiber optic cables in the first group is equal to a total quantity of fiber optic cables in the second group.

14. The fiber optic cable assembly of claim 13, wherein the total quantity of fiber optic cables in the first group is equal to four.

15. The fiber optic cable assembly of claim 12, wherein a total quantity of fiber optic cables in the second group is equal to half of a total quantity of the fiber optic cables in the first group.

16. The fiber optic cable assembly of claim 12, wherein the fiber optic cable bundle includes a third group of fiber optic cables, each of the fiber optic cables in the third group having a first axial end, wherein the first axial ends of the third group are axially offset from the first axial ends of the second group by a second axial offset distance.

17. The fiber optic cable assembly of claim 12, further comprising a cable spool stand, wherein the cable spool is rotatably engaged with the cable spool stand.

18. The fiber optic cable assembly of claim 12, wherein the fiber optic cable bundle includes a pulling eye engaged to the first axial ends of the fiber optic cables of the first and second groups.

19. The fiber optic cable assembly of claim 18, wherein the pulling eye is a flexible nylon mesh.

20. A fiber optic cable bundle assembly comprising:
   a fiber optic cable bundle having a first end portion and an oppositely disposed second end portion, the fiber optic cable bundle including:
      a first group of fiber optic cables, each of the fiber optic cables in the first group having a first axial end and including a connector at the first axial end of the fiber optic cables in the first group, the first group of fiber optic cables adapted to be routed to a first location of a facility;
      a second group of fiber optic cables, each of the fiber optic cables in the second group having a first axial end and including a connector at the first axial end of the fiber optic cables in the second group, the second group of fiber optic cables adapted to be routed to a second location of the facility separated from the first location of the facility;
      wherein each of the fiber optic cables of the first and second groups includes an optical fiber and a jacket surrounding the optical fiber; and
      wherein the connectors of the second group are offset from the connectors of the first group by a first axial offset distance at the first end portion of the fiber optic cable bundle; and
   a plurality of binder members contra-helically served about the fiber optic cable bundle.

21. The fiber optic cable bundle assembly of claim 1, wherein the plurality of binder members are exposed.

\* \* \* \* \*